United States Patent [19]

Hart

[11] 4,073,544
[45] Feb. 14, 1978

[54] CONTINUAL QUICK SERVICE VALVE DEVICE

[75] Inventor: James E. Hart, Trafford, Pa.

[73] Assignee: Westinghouse Air Brake Company, Wilmerding, Pa.

[21] Appl. No.: 780,473

[22] Filed: Mar. 23, 1977

[51] Int. Cl.² ............................................. B60T 17/04
[52] U.S. Cl. ........................................ 303/83; 303/38
[58] Field of Search ...................... 303/36–39, 303/69, 82, 83

[56] References Cited

U.S. PATENT DOCUMENTS

| | | | |
|---|---|---|---|
| 3,018,138 | 1/1962 | Wilson et al. | 303/36 |
| 3,160,447 | 12/1964 | McClure et al. | 303/83 |
| 3,175,871 | 3/1965 | Wilson | 303/82 |
| 3,240,540 | 3/1966 | McClure | 303/83 |
| 3,716,276 | 2/1973 | Wilson et al. | 303/82 |
| 3,966,269 | 6/1976 | McEathron | 303/37 |

*Primary Examiner*—Duane A. Reger
*Attorney, Agent, or Firm*—W. F. Poore; R. W. McIntire, Jr.

[57] ABSTRACT

This invention relates to a railway vehicle continual quick service valve device that operates in reoccurring cycles so long as fluid under pressure is being released from a train brake pipe by a brake valve device on the locomotive to, upon each cycle, locally release fluid under pressure from the train brake pipe to atmosphere via this valve device on each vehicle.

10 Claims, 1 Drawing Figure

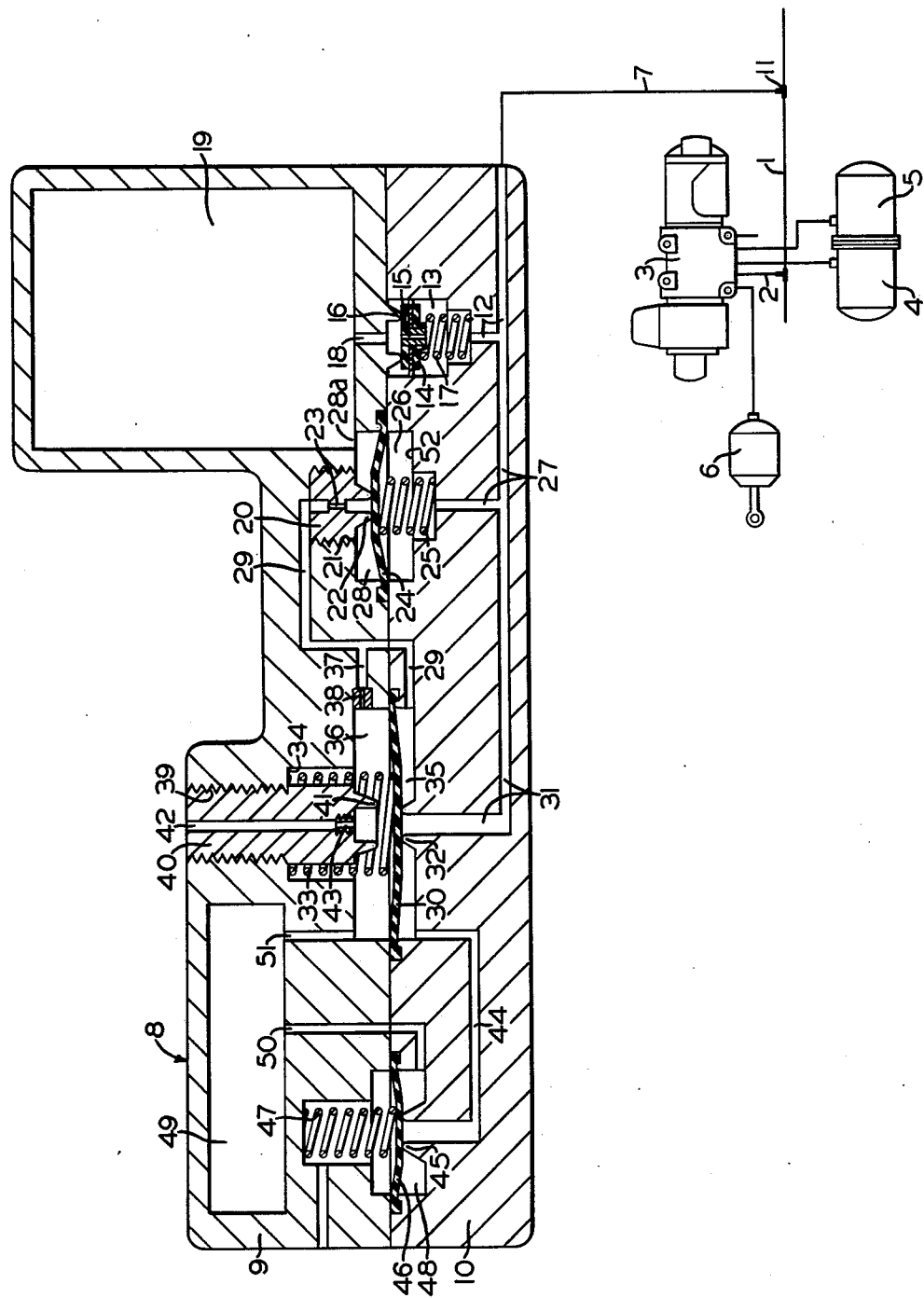

CONTINUAL QUICK SERVICE VALVE DEVICE

BACKGROUND OF THE INVENTION

In the copending patent application, Ser. No. 740,837, of James E. Hart, filed Nov. 11, 1976 and assigned to the assignee of the present application, there is shown and described a novel emergency portion for a railway vehicle brake control valve device wherein, upon effecting a service brake application, fluid under pressure is vented from a quick action chamber into the train brake pipe.

Moreover, in U.S. Pat. No. 3,716,276, issued Feb. 13, 1973 to Richard L. Wilson et al and assigned to the assignee of the present application, there is shown and described a brake control valve device that is substantially the same in function and operation as the latest design of brake control valve device now being offered to the railway industry as the brake control valve device included in the standard fluid pressure brake apparatus installed on any new freight cars built subsequent to Jan. 1, 1977. In this brake control valve device, the fluid under pressure released from the quick action chamber, when effecting a service brake application, is used to operate a continual quick service valve device that effects a "quick service" transmission through a train brake pipe of a pressure reduction wave.

It is obvious that when fluid under pressure is vented from the quick action chamber into the brake pipe when effecting a service brake application, as is the case in the brake control valve device shown and described in the above-mentioned copending patent application, Ser. No. 740,837, the fluid under pressure thus vented from the quick action chamber into the brake pipe cannot be used to operate a continual quick service valve device to effect a "quick service" transmission through a train brake pipe of a pressure reduction wave.

Accordingly, it is the general purpose of this invention to provide a novel continual quick service valve device for use in combination with a brake control valve device of the type in which fluid under pressure is vented from a quick action chamber into the train brake pipe when effecting a service brake application.

SUMMARY OF THE INVENTION

According to the present invention, a novel continual quick service valve device is provided which embodies therein a control volume that is charged via a choke to the same pressure as is carried in the train brake pipe and three diaphragm-type valves that are so subject on their respective opposite sides to the pressure in the train brake pipe and to the pressure in the control volume or to atmospheric pressure as to cause operation thereof in reoccurring cycles, so long as a service rate of reduction of pressure in a train pipe continues, to locally vent fluid under pressure from the train brake pipe to a quick service volume and to one side of one of the diaphragm-type valves to cause it to operate so as to cut off flow of fluid under pressure from the brake pipe to the quick service volume and then release the fluid under pressure in this volume to atmosphere.

In the accompanying drawing:

The single FIGURE is a diagrammatic view, partly in section, showing a brake control apparatus for a railway freight car embodying the invention.

DESCRIPTION

As shown in the drawing, the fluid pressure brake apparatus constituting the present invention comprises a brake pipe 1, a first branch pipe 2, a brake control valve device 3, an auxiliary reservoir 4, an emergency reservoir 5, a brake cylinder 6, a second branch pipe 7, and a continual quick service valve device 8.

The brake control valve device 3 may be of the type disclosed in the above-mentioned copending patent application, Ser. No. 740,837, wherein, upon effecting a service brake application, fluid under pressure is vented from a quick action chamber into the train brake pipe and, therefore, is not available for operating a continual quick service valve device of the type disclosed in the above-mentioned U.S. Pat. No. 3,716,276.

In view of the above-mentioned copending patent application, Ser. No. 740,837, it is deemed unnecessary to show and describe in detail the brake control valve device 3 and the brake cylinder 6. It will, of course, be understood that the brake control valve device 3 operates upon a service rate of reduction of pressure in a train brake pipe to effect the supply of fluid under pressure from the auxiliary reservoir 4 to the brake cylinder 6 to cause a service brake application, upon an emergency rate of reduction of pressure in the train brake pipe to effect the supply of fluid under pressure from both the auxiliary reservoir 4 and the emergency reservoir 5 to the brake cylinder 6 to cause an emergency brake application, and upon an increase in the pressure of the fluid in the train brake pipe, subsequent to a brake application, to effect a full release of the brakes and the charging of the auxiliary reservoir 4 and emergency reservoir 5 to the normal fully charged pressure carried in the train brake pipe. It will also be understood that the brake cylinder 6 is effective to apply to the wheels of a railway vehicle a braking force proportional to the pressure of the fluid supplied to this brake cylinder by the brake control valve device 3.

The continual quick service valve device 8 comprises a pair of casing sections 9 and 10 that are secured together by any suitable means (not shown). Secured to the casing section 10 is one end of the second branch pipe 7, the opposite end being connected to the side outlet of a pipe tee 11 disposed in the brake pipe 1.

Formed in the casing section 10 is a passageway 12, to one end of which is secured the one end of the branch pipe 7 and the other end opening into a chamber 13 formed by the cooperative relationship of the casing sections 9 and 10.

Disposed in the chamber 13 is a flat disc-type valve 14 through which extends a bore of small diameter so as to constitute a charging choke 15. This disc valve 14 is normally biased against an annular valve seat 16 formed on the casing section 9 by a spring 17 disposed in the chamber 13 and interposed between this valve 14 and the bottom of the chamber 13.

The diameter of the choke 15 determines the rate of flow of fluid under pressure from the chamber 13, which is connected to brake pipe 1 by the passageway 12 and the second branch pipe 7, to a passageway 18 formed in the casing section 9 and opening at one end within the annular valve seat 16. The other end of this passageway 18 opens into a control volume 19 formed within the casing section 9. It is apparent from the foregoing that this control volume 19 is charged from the train brake pipe at a rate determined by the size of the choke 15 which constitutes a charging choke for this volume 19.

As shown in the drawing, formed at the lower end of a screw-threaded plug 20 that has screw-threaded engagement with a screw-threaded bottomed bore 21 provided therefor in the casing section 19, is an annular valve seat 22. Extending from the opposite ends of the plug 20 are counterbores that are coaxial with a bore 23 of small diameter which constitutes a choke. The diameter of this bore or choke 23 is such as to provide for the flow of fluid under pressure therethrough from the control volume 19 at such a rate that the pressure in this control volume 19 will reduce at the same rate as the pressure in the brake pipe 1 will reduce when fluid under pressure is released from the train brake pipe at a service rate by an engineer's brake valve device on the locomotive.

A first diaphragm valve 24 that has its outer periphery clamped between the casing sections 9 and 10 is normally biased against the valve seat 22 by a spring 25. This spring 25 is disposed in a chamber 26 that is formed by the cooperative relationship of the diaphragm valve 24 and the casing section 10 and is interposed between the lower side of this diaphragm valve 24 and the bottom of the chamber 26 into which opens one end of a passageway 27 that extends through the casing section 10 and opens into the passageway 12 intermediate the ends thereof.

While the spring 25 biases the diaphragm valve 24 against the annular valve seat 22, the upper side of this diaphragm valve 24 cooperates with the casing section 9 to form on the outside of the valve seat 22 a chamber 28 that is constantly open to the control volume 19 via a port 28a. Thus, while the spring 25 biases the diaphragm valve 24 against the valve seat 22, communication is closed between the control volume 19 and one end of a passageway 29 in the casing section 9. When the diaphragm valve 24 is unseated from the annular valve seat 22, in a manner hereinafter described, fluid under pressure is supplied from the control volume 19 through the choke 23 and passageway 29 to the opposite sides of a diaphragm-type accelerated application valve 30, the outer periphery of which is clamped between the casing sections 9 and 10.

As shown in the drawing, the casing section 10 is provided with a passageway 31 that at one end opens into the passageway 27 intermediate the ends thereof and at its other end within an annular valve seat 32 formed on the casing section 10. The lower side of the accelerated application valve 30 is normally biased against the valve seat 32 by a spring 33 that is interposed between the upper side of this accelerated application valve 30 and a shoulder 34 formed on the casing section 9. While the diaphragm valve 30 is thus biased against the valve seat 32, communication is closed between the passageway 31 and a chamber 35 that is formed between the lower side of the diaphragm valve 30 and the casing section 10 and into which chamber 35 opens the other end of the above-mentioned passageway 29.

The upper side of the diaphragm valve 30 cooperates with the casing section 9 to form a chamber 36 that is connected to the passageway 29 intermediate the ends thereof by a short passageway 37 that has disposed therein at the end thereof that opens into the chamber 36 a choke 38, the diameter of which controls the rate of flow of fluid under pressure from the passageway 29 into the chamber 36.

As shown in the drawing, extending inward from the top of the casing section 9 is a screw-threaded bore 39 in which is received a screw-threaded plug 40 that has formed on its lower end an annular valve seat 41. Extending vertically through the plug 40 is a passageway 42 in which is disposed a screw-threaded choke 43, the diameter of which controls the rate of flow of fluid under pressure from the chamber 36 to atmosphere via this choke 43 and the passageway 42. The diameter of the choke 43 is greater than the diameter of the choke 38 for a reason hereinafter made apparent.

Opening into the chamber 35 is one end of a second passageway 44 that extends through the casing section 10 and at its other end opens within an annular valve seat 45 formed on the casing section 10. A third diaphragm valve 46 that has its outer periphery clamped between the casing sections 9 and 10 has its lower side normally biased against the annular valve seat 45 by a spring 47 that is interposed between the upper side of this diaphragm valve 46 and the casing section 9. While the diaphragm valve 46 is thus biased against the valve seat 45, communication is closed between the passageway 44 and a chamber 48 that is formed between the lower side of the diaphragm valve 46 and the casing section 10. This chamber 48 is connected to a quick service volume 49 formed in the casing section 9 by a passageway 50 that extends through the casing sections 9 and 10.

The quick service volume 49 is connected to the chamber 36 by a passageway 51 that extends through the casing section 9. Therefore, while the spring 33 biases the diaphragm-type accelerated application valve 30 against the annular valve seat 32, the quick service volume 49 is open to atmosphere via the passageway 51, chamber 36, past valve seat 41, choke 43 and passageway 42.

OPERATION

Initial Charging

Let it be assumed that a railway freight car provided with the brake control valve device 3 and the continual quick service valve device 8 has been coupled into a train of cars, and that a handle of an engineer's brake valve device (not shown) located on the locomotive that is coupled to the head end of the train is in its release position. Therefore, while the handle of the engineer's brake valve device is in its release position, this brake valve device will effect the supply of fluid under pressure to the train brake pipe and, therefore, to the brake pipe 1, to charge the brake pipe 1 to a preselected normal charged value which, for example, may be 70 pounds per square inch.

Fluid under pressure supplied to the brake pipe 1 will cause the brake control valve device 3 to operate in the manner explained in the above-mentioned copending patent application, Ser. No. 740,837, to effect a release of the brakes on the car and the charging of the auxiliary reservoir 4 and the emergency reservoir 5.

Fluid under pressure supplied to the brake pipe 1 will flow therefrom to: (1) the chamber 13 via the second branch pipe 7 and passageway 12, (2) the chamber 26 from the passageway 12 via the passageway 27, and (3) the passageway 31 from the passageway 27.

The fluid under pressure supplied to the chamber 13 flows through the choke 15 to the control volume 19 to charge this volume 19 to the pressure carried in the train brake pipe.

The fluid pressure force together with the force of spring 25 provides a force that acts in an upward direction on the lower side of the diaphragm valve 24 that is greater than the fluid pressure force acting downward on the upper side of this diaphragm valve 24 as the result of the fluid under pressure supplied to the chamber 27 from the control volume 19 via the port 28a. Therefore, this greater force acting upward on the diaphragm valve 24 is effective to maintain it seated on valve seat 22 to prevent flow of fluid under pressure from the chamber 28 and the control volume 19 to the passageway 29 which is open to atmosphere via passageway 37, choke 38, chamber 36, past valve seat 41, choke 43 and passageway 42.

The strength of the spring 33 is such as to maintain the diaphragm valve 30 seated on the annular valve seat 32 against brake pipe pressure acting on the lower side of the diaphragm valve 30 and within this annular valve seat 32. Therefore, no fluid under pressure flows from the passageway 31 to the chamber 35 which is open to atmosphere via passageways 29 and 37, choke 38, chamber 36, past valve seat 41, choke 43 and passageway 42.

Since the passageway 44 opens into the chamber 35, this passageway 44 opens into the chamber 35, this passageway 44 is open to atmosphere at this time.

Moreover, the chamber 48 is open to atmosphere via passageway 50, quick service volume 49, passageway 51, chamber 36 and the pathway described above. Therefore, the spring 47 is effective to maintain the diaphragm valve 46 seated on the valve seat 45.

SERVICE BRAKE APPLICATION

To manually effect a service brake application on all the cars in the train, the engineer will move the handle of the brake valve device on the locomotive arcuately from its release position into its service application zone to a position corresponding to the degree of service brake application desired. When the handle of the engineer's brake valve device is moved into the service zone, the brake valve device operates to vent fluid under pressure from the brake pipe 1 to atmosphere at a service rate until the pressure in the brake pipe 1 is reduced a corresponding degree.

As the pressure in the brake pipe 1 is reduced, the brake control valve device 3 operates in the manner described in the above-mentioned copending application, Ser. No. 740,837, to effect an initial quick service reduction in brake pipe pressure by venting fluid under pressure from the brake pipe into the quick service volume 21 (in the copending application Ser. No. 740,837) and a service brake application on the freight car on which the brake control valve device 3 is installed, the degree of this service brake application corresponding to the degree of reduction of pressure effected in the brake pipe 1. The brake control valve device 3 then moves to a lap position.

Also, as the pressure in the brake pipe 1 is reduced by flow therefrom to atmosphere via the engineer's brake valve device on the locomotive, fluid under pressure will flow at a service rate from the chambers 26 and 13 below the diaphragm valve 22 and disc valve 14 respectively to the brake pipe 1 via passageways 27 and 12 and second branch pipe 7.

The choke 15 restricts the rate of flow of fluid under pressure from the control volume 19 to the chamber 13 and thence to the brake pipe 1.

Since the control volume 19 is connected to the chamber 28 by the port 28a, it is apparent that the pressure in the chamber 26 quickly becomes less than that in the chamber 28.

Therefore, a differential of pressure is established on the diaphragm valve 24 to deflect it downward so that this diaphragm valve 24 is unseated from the valve seat 22.

Upon the unseating of diaphragm valve 24 from the valve seat 22, fluid under pressure flows from the control volume 19 to the chamber 35 below the diaphragm 30 via port 28a, chamber 28, past valve seat 22, choke 23 and passageway 29 at a service rate which is determined by the size of the choke 23.

It will be noted from the drawing that some of the fluid under pressure supplied to the passageway 29 will flow therefrom to the chamber 36 via the choke 38. However, the chamber 36 is open to atmosphere past the valve seat 41, choke 43 and passageway 42. Accordingly, it is apparent that the fluid under pressure supplied to the chamber 35 establishes a fluid pressure force which acts in an upward direction on the diaphragm valve 30. When this fluid pressure force is sufficient to overcome the yielding resistance of the spring 33, the diaphragm valve 30 will be unseated from the valve seat 32 and shifted upward until it is seated on the valve seat 41. It should be noted that even though the strength of spring 33 is such as to maintain the diaphragm valve 30 seated on the valve seat 32 against brake pipe pressure acting upward on the area within the annular valve seat 32, the pressure in the chamber 35, as the result of flow of fluid under pressure thereto from the volume chamber 19, via the pathway described above, does not have to build up to the pressure in the volume chamber 19 in order to establish a sufficient fluid pressure force on the diaphragm valve 30 to shift it upward against the yielding resistance of this spring 33 until the upper side of this diaphragm valve 30 engages the valve seat 41. It will be noted from the drawing that when the diaphragm valve 30 is shifted upward until its upper side engages the valve seat 41, the quick service volume 49 is no longer open to atmosphere via passageway 51, chamber 36, past valve seat 41, choke 43 and passageway 42.

As soon as diaphragm valve 30 is unseated from the valve seat 32 in the manner explained above, fluid under pressure from the brake pipe 1 which is present in the passageway 31 will flow into the chamber 35, it being noted that fluid under pressure is also flowing into this chamber 35 from the control volume 19 via the choke 23 at a service rate.

Accordingly, fluid under pressure will simultaneously flow in the chamber 35 from the brake pipe 1 via the passageway 36 and also from the chamber 19 via the choke 23 and passageway 29.

Since the upper side of the diaphragm valve 24, which is now unseated from the valve seat 22, is subject to the pressure in the control volume 19 and the lower side of this diaphragm valve 24 is subject to brake pipe pressure and the force of the spring 25, the pressure in the control volume 19 will be reduced to a chosen pressure which is higher than the pressure in the brake pipe 1 by an amount that is dependent upon the value of the spring 25 for the reason that when the pressure in the control volume 19 and acting on the upper side of the diaphragm valve 24 is reduced to this chosen pressure, the spring 25 will seat the diaphragm valve 24 on the seat 22 and prevent a further reduction of the pressure in the control volume 19.

It will be noted from the drawing that the fluid under pressure flowing into the chamber 35 from the brake pipe 1, and also from the control volume 19, may flow into the passageway 44 and act on the lower side of the diaphragm valve 46 within the annular valve seat 45. Since the spring 47 biases the diaphragm valve 46 against the annular valve seat 45, fluid under pressure cannot flow from the passageway 44 to the chamber 48 until the pressure in the passageway 44 and acting on the area of the lower side of the diaphragm 46 within the annular valve seat 45 establishes a fluid pressure force that is greater than the force of this spring 47. The area within the annular valve seat 45 is comparatively small. Therefore, the spring 47, by maintaining the diaphragm valve 46 seated on the annular valve seat 45 until the force of this spring 47 is overcome by the pressure in the passageway 44 acting on the small area within the annular valve seat 45, causes a rapid buildup of pressure in the chamber 35 so that the diaphragm valve 30 is quickly shifted upward into seating engagement with the annular valve seat 41.

When the pressure in the passageway 44 and acting on the lower side of the diaphragm valve 46 over the area within the annular valve seat 45 is increased sufficiently to establish a fluid pressure force that acts in an upward direction and is slightly in excess of the force of the spring 47, which acts in a downward direction, the diaphragm valve 46 will be unseated from the annular valve seat 45 against the yielding resistance of the spring 47.

When the diaphragm valve 46 is thus unseated from the annular valve seat 45, fluid under pressure will flow from the passageway 44, chamber 35 and the brake pipe 1 to the chamber 48 and thence to the quick service volume 49 via the passageway 50 for the reason that the brake pipe 1 is now connected to the passageway 44 via the branch pipe 7, passageways 12, 27 and 31, past valve seat 32, and chamber 35 since diaphragm valve 30 is now seated on valve seat 41.

The above-mentioned flow of fluid under pressure from the brake pipe 1 to the quick service volume 49 effects a local reduction of the pressure in the brake pipe 1 in addition to the reduction of the pressure in the train brake pipe effected by the release of fluid under pressure from the train brake pipe as the result of the engineer moving the handle of the engineer's brake valve device on the locomotive from its release position to a position in its application zone.

It will be noted from the drawing that the fluid under pressure supplied from the brake pipe 1 to quick service volume 49, and also to this quick service volume 49 from the control volume 19 until the diaphragm valve 24 is seated on the valve seat 22 by the spring 25 in the manner explained above, may flow from this quick service volume 49 to the chamber 36 via the passageway 51.

From the foregoing, it is apparent that this flow of fluid under pressure into the chamber 36 from the quick service volume 49 increases the pressure in the chamber 36 and thereby establishes a fluid pressure force which acts in a downward direction on the area of the upper side of the diaphragm valve 30 outside of the annular valve seat 41.

It is evident that when the sum of the force of the spring 33 and the fluid pressure force acting in a downward direction on the effective area of the upper side of the diaphragm valve 30 outside of the annular valve seat 41 slightly exceeds the upwardly acting fluid pressure force on the effective area of the lower side of this diaphragm valve 30 as the result of the fluid under pressure present in the chamber 35 acting in an upward direction over the entire effective area of the lower side of this diaphragm valve 30, this diaphragm valve 30 will be deflected in a downward direction and away from the annular valve seat 41. It will be noted that when the diaphragm valve 30 is unseated from the valve seat 41, the fluid under pressure present in the chamber 36 will act over a larger effective area. Therefore, the diaphragm valve 30 will be forced downward into seating contact with the valve seat 32 with a snap action.

When the diaphragm valve 30 is unseated from the annular valve seat 41 in the manner just explained, the fluid under pressure present in the chamber 36 and the quick service volume 49 connected to this chamber 36 by the passageway 51 will flow to atmosphere via the choke 43 and passageway 42.

Moreover, with the diaphragm valve 30 now seated on the valve seat 32, fluid under pressure will no longer flow from the passageway 31 and the brake pipe 1 to the chamber 35.

Fluid under pressure will now flow from chamber 35 to atmosphere so long as the pressure in chamber 48 is high enough to maintain diaphragm valve 46 unseated from valve seat 45 against force of spring 47. When the pressure in the chamber 48 is thus reduced by flow to atmosphere via choke 43 to a value less than that of the spring 47, this spring will deflect diaphragm valve 46 downward until it is seated on valve seat 45 thereby cutting off flow from chamber 35 to atmosphere.

The diaphragm valve 24 is now seated on seat 22, the diaphragm valve 30 is now seated on seat 32 and the diaphragm valve 46 is now seated on seat 45. Therefore, the continual quick service valve device 8 has completed one cycle to release fluid under pressure locally from the brake pipe 1 to atmosphere.

It will be remembered that fluid under pressure is till being released from the brake pipe 1 and the train brake pipe to atmosphere via the engineer's brake valve device on the locomotive since the handle of this brake valve device still occupies the position in its application zone to which it was moved by the engineer.

Therefore, fluid under pressure is flowing from the chamber 26 below the diaphragm valve 24 and also the chamber 13 to atmosphere at a service rate via the engineer's brake valve device.

The choke 15 restricts the rate of flow of fluid under pressure from the control volume 19 to the chamber 13 and thence to atmosphere via the brake valve device. Accordingly, it is apparent that the pressure in the control volume 19 and chamber 28 is not reduced as fast as the pressure in the chambers 26 and 13.

Since the pressure in the chamber 26 thus quickly becomes less than that in the chamber 28, a differential of pressure is established on the diaphragm valve 24 to deflect it downward so that it is unseated from the valve seat 22.

The continual quick service valve device 8 will now operate in the manner hereinbefore described to complete another cycle of operation to release fluid under pressure locally from the brake pipe 1 to atmosphere.

From the above, it is apparent that so long as fluid under pressure is being released from the train brake pipe by the engineer's brake valve device on the locomotive, the continual quick service valve device 8 will operate sequentially or in repeated cycles to locally vent fluid under pressure from the brake pipe 1 to the quick service volume 49 and thence to atmosphere to thereby hasten a brake pipe reduction wave from the locomotive to the last car in the train.

When the pressure in the train brake pipe is reduced to a value corresponding to the position to which the handle of the engineer's brake valve device has been moved in its service application zone, this brake valve device will cease to release fluid under pressure from the train brake pipe and the brake pipe 1.

Consequently, fluid under pressure will no longer be released from the chambers 13 and 26 in the continual quick service valve device 8. Therefore, it is apparent that this valve device 8 will cease to operate in respected cycles to release fluid under pressure locally from the brake pipe 1.

RELEASE SUBSEQUENT TO A SERVICE BRAKE APPLICATION

When it is desired to effect a brake release subsequent to effecting a service brake application in the manner described above, the engineer will move the handle of the brake valve device on the locomotive from the position it occupies in its service application zone arcuately back to its release position.

When the handle of the brake valve device is thus returned to its release position, this brake valve device will operate to effect the supply of fluid under pressure to the train brake pipe and, therefore, to the brake pipe 1, to charge the train brake pipe and the brake pipe 1 to the hereinbefore-mentioned preselected normal charged value which, for example, may be 70 pounds per square inch.

The control valve 3 will now operate in the manner explained in the above-mentioned copending patent application, Ser. No. 740,837, to effect a release of the brakes on the car and the charging of the auxiliary reservoir 4 and the emergency reservoir 5.

Moreover, fluid under pressure will flow from the brake pipe 1 to the chambers 13, 26 and 19 in the continual quick service valve device 8 via the pathways hereinbefore described in connection with the initial charging of the brake apparatus constituting the present invention.

Since fluid under pressure is now supplied to the chambers 13 and 26 rather than being released therefrom, the springs 17 and 25 will maintain the disc valve 14 and diaphragm valve 24 seated on the valve seats 16 and 22. Therefore, the control volume 13 and chamber 28 will be charged via the charging choke 15 to the pressure carried in the train brake pipe.

With the diaphragm valve 46 now seated on its seat 45 and the diaphragm valve 30 now seated on its seat 32, it may be noted that any fluid under pressure remaining in the passageway 44 and the chamber 35 after the continual quick service valve device 8 completed its last cycle of operation, will be vented to atmosphere via passageways 29 and 37, choke 38, chamber 36, past valve seat 41, choke 43 and passageway 42.

EMERGENCY BRAKE APPLICATION

When an emergency brake application is effected, fluid under pressure is released from the brake pipe 1, second branch pipe 7, passageways 12 and 27 and chambers 13 and 26 at an emergency rate.

This release of fluid under pressure from the chamber 26 at an emergency rate establishes a differential of pressure on the diaphragm valve 24 which acts in a downward direction to unseat this diaphragm valve 24 from the valve seat 22 whereupon fluid under pressure will flow from the control volume 19 to atmosphere via the chokes 23, 38 and 43 in series.

Since fluid under pressure is now being released from the control volume 19 and the chamber 28 via chokes 23, 38 and 43 in series, and from the chambers 26 and 13 at an emergency rate, which is a much faster rate than can occur through these chokes, it is apparent that the diaphragm valve 24 is deflected downward against the yielding resistance of the spring 25 until it abuts a stop surface 52 on the casing section 10, and the disc valve 14 will be unseated from valve seat 16 against the yielding resistance of the spring 17. Therefore, all the fluid under pressure in the control volume 19 will be released to atmosphere via the chokes 23, 38 and 43 in series, and also via the chamber 13, passageway 12, second branch pipe 7, brake pipe 1, the train brake and the engineer's brake valve device on the locomotive, the handle of which brake valve device is in its emergency position to cause the release of all the fluid under pressure in the train brake pipe.

Since all fluid under pressure is released from the control volume 19 in the quick service valve device 8 and also from the train brake pipe when an emergency brake application is effected, it is apparent that this quick service valve device 8 is rendered inoperative to operate in cycles to release fluid under pressure from the brake pipe 1 to atmosphere.

Having now described the invention, what I claim as new and desire to secure by Letters Patent, is:

1. In a fluid pressure brake equipment, the combination of a brake pipe normally charged with fluid to a certain chosen pressure and a continual quick service valve device comprising:
   (a) a control volume,
   (b) choke means for controlling the rate of flow of fluid under pressure from the brake pipe to said control volume whereby said control volume is charged with fluid under pressure from the brake pipe to the same pressure as that in the brake pipe,
   (c) a quick service volume,
   (d) a pair of fluid pressure operated valve means arranged in series for controlling flow of fluid under pressure from the brake pipe to said quick service volume, the first of said fluid-pressure-operated valve means being so arranged and constructed as to, when in a first position, enable flow of fluid under pressure from both said control volume and said quick service volume to atmosphere while cutting off flow from the brake pipe to said quick service volume and, when in a second position, enable flow of fluid under pressure from the brake pipe to the quick service volume while cutting off flow from both said control volume and said quick service volume to atmosphere, and the second of said fluid-pressure-operated valve means constituting a spring-biased valve for enabling flow from both the brake pipe and said control volume to said quick service volume while said first valve means is in its said second position,
   (e) three choke means so arranged in series as to enable flow of fluid under pressure therethrough from said control volume to atmosphere while said first valve means is in its said first position, the first of said choke means being of such size as to enable the flow of fluid under pressure therethrough at a service rate of reduction of brake pipe pressure and so arranged as to, in cooperation with the second of said choke means, establish a differential fluid pressure to cause said first fluid-pressure-operated valve means to operate from its first position to its second position, and the third of said choke means being of a size greater than the size of said second choke means and so arranged as to release fluid under pressure from said quick service volume to atmosphere while said first fluid-pressure-operated valve means is in its said first position independently of said first and second choke means, and (f) a third fluid-pressure-operated valve means for controlling flow of fluid under pressure from said control volume to the first of said choke means, said third fluid-pressure-operated valve means comprising:

(i) a biasing means, (ii) a valve seat, and (iii) a movable abutment so arranged as to constitute a valve movable into and out of seating engagement with said valve seat, said abutment being subject on the side thereof adjacent said valve seat to the pressure in said control volume and on its other side to said biasing means and also the pressure of the fluid in the brake pipe so that a reduction of pressure in the brake pipe enables the fluid under pressure in the control volume to unseat said abutment from said valve seat whereby so long as said abutment is unseated from said valve seat, fluid under pressure flows from said control volume through said first and second choke means to establish said differential fluid pressure thereby enabling successive sequential operation of said pair of fluid-pressure-operated valve means to release fluid under pressure from the brake pipe to said quick service volume and thereafter release the fluid under pressure in said quick service volume to atmosphere.

2. A continual quick service valve device, as recited in claim 1, further characterized in that said first fluid-pressure-operated valve means includes a pair of coaxial spaced-apart valve seats and a diaphragm valve so disposed between said seats as to engage one of said seats in said first position to cut off flow from the brake pipe to the quick service volume, and to engage the other of said seats in said second position to cut off flow from both said control volume and said quick service volume to atmosphere.

3. A continual quick service valve device, as recited in claim 1, further characterized in that said first fluid-pressure-operated valve means includes a pair of coaxial spaced-apart valve seats and a diaphragm valve so disposed between said seats as to be moved, upon the establishment of said differential fluid pressure, from its said first position in which it engages one of said seats to cut off flow from the brake pipe to the quick service volume to its said second position in which it engages the other of said seats to cut off flow from both said control volume and said quick service volume to atmosphere.

4. A continual quick service valve device, as recited in claim 1, further characterized in that said second fluid-pressure-operated valve means includes a valve seat and a spring-biased diaphragm valve for normally engaging said valve seat to cut off flow from said first fluid-pressure-operated valve means to said quick service volume, said spring-biased diaphragm valve being movable out of engagement with said valve seat, in response to the fluid under pressure acting on said diaphragm valve within said valve seat establishing a fluid pressure force that exceeds the spring bias on said diaphragm valve, to enable flow of fluid under pressure from the brake pipe to said quick service volume upon operation of said first fluid-pressure-operated valve means from its said first position to its said second position.

5. A continual quick service valve device, as recited in claim 1, further characterized in that each of said three choke means is removable from said continual quick service valve device without effecting removal of either one of the other two.

6. A continual quick service valve device, as recited in claim 1, further characterized in that said quick service valve device comprises a sectionalized casing having a pair of casing sections, one of which carries therein said three choke means and to the other of which is connected the brake pipe.

7. A continual quick service valve device, as recited in claim 1, further characterized in that said first valve means comprises:

(a) a first annular valve seat, (b) a second annular valve seat coaxial with and spaced apart from said first annular valve seat, (c) a valve disposed between said first and said second annular valve seats, and (d) biasing means for normally biasing said valve into seating contact with said first annular valve seat to cut off flow from the brake pipe to said quick service volume.

8. A continual quick service valve device, as recited in claim 2, further characterized in that said other valve seat is so disposed that when engaged by said diaphragm valve, communication is closed between the second and the third of said three choke means in series.

9. A continual quick service valve device, as recited in claim 3, further characterized by biasing means for normally biasing said diaphragm valve into engagement with said one seat and yieldingly resisting movement of said diaphragm valve into engagement with said other seat.

10. A continual quick service valve device, as recited in claim 3, further characterized in that said diaphragm valve of said first fluid-pressure-operated valve means, when unseated from said one valve seat, in cooperation with said abutment of said third fluid-pressure-operated valve means, when unseated from its said valve seat, establishes a communication through which fluid under pressure momentarily flows from said control volume to the brake pipe until the pressure of the fluid in said control volume is reduced to such a value as to enable said biasing means of said third fluid-pressure-operated valve means to seat said abutment on said one valve seat to terminate flow from said control volume to the brake pipe prior to the reduction of the pressure in said control volume to that in the brake pipe.

* * * * *